(12) United States Patent
Eakin

(10) Patent No.: US 10,184,824 B1
(45) Date of Patent: Jan. 22, 2019

(54) WEIGHT ACTIVATED ANIMAL MARKING SCALE

(71) Applicant: Osborne Industries, Inc., Osborne, KS (US)

(72) Inventor: George R Eakin, Osborne, KS (US)

(73) Assignee: Osborne Industries, Inc., Osborne, KS (US)

( * ) Notice: Subject to any disclaimer, the term of this patent is extended or adjusted under 35 U.S.C. 154(b) by 175 days.

(21) Appl. No.: 15/442,549

(22) Filed: Feb. 24, 2017

Related U.S. Application Data

(60) Provisional application No. 62/299,114, filed on Feb. 24, 2016.

(51) Int. Cl.
| | |
|---|---|
| *A01K 1/00* | (2006.01) |
| *A01K 11/00* | (2006.01) |
| *G01G 1/00* | (2006.01) |
| *G01G 17/08* | (2006.01) |
| *G01G 21/22* | (2006.01) |
| *G01G 21/23* | (2006.01) |
| *G01G 23/18* | (2006.01) |

(52) U.S. Cl.
CPC ........... *G01G 17/08* (2013.01); *A01K 1/0023* (2013.01); *A01K 11/00* (2013.01); *G01G 1/00* (2013.01); *G01G 21/22* (2013.01); *G01G 21/23* (2013.01); *G01G 23/18* (2013.01)

(58) Field of Classification Search
CPC ........ A01K 1/0023; A01K 11/00; G01G 1/00; G01G 17/08; G01G 21/22; G01G 21/23; G01G 23/18
See application file for complete search history.

(56) References Cited

U.S. PATENT DOCUMENTS

| | | | | | |
|---|---|---|---|---|---|
| 4,134,366 | A | * | 1/1979 | Elliott | A01K 1/0613 119/842 |
| 4,138,968 | A | * | 2/1979 | Ostermann | A01K 1/0613 119/842 |
| 4,286,679 | A | * | 9/1981 | Schneider | G01G 17/08 177/132 |
| 4,533,008 | A | * | 8/1985 | Ostermann | G01G 21/18 177/132 |

(Continued)

*Primary Examiner* — Randy W Gibson
(74) *Attorney, Agent, or Firm* — Jeffrey L. Thompson; Thompson & Thompson, P.A.

(57) ABSTRACT

A mechanical scale has a weighing basket with a platform having entrance and exit ends. A hanging assembly for supporting the weighing basket includes a break-over beam. A counterweight assembly is connected to the break-over beam and is adjustable to select a threshold scale weight required to trigger a scale-operated feature, such as a spray marking mechanism. The counterweight assembly has a weight selection device bracket pivotally mounted to the frame assembly about a pivot point, and a freely moveable counterweight mass supported by the bracket. The freely moveable counterweight mass is moveable from a first position to a second position when the threshold scale weight is exceeded in the weighing basket, thereby causing an abrupt triggering of the scale-operated feature when the threshold scale weight is exceeded in the weighing basket. The freely moveable counterweight mass is a rolling spherical member enclosed within a hollow chamber inside the bracket.

21 Claims, 16 Drawing Sheets

(56) References Cited

U.S. PATENT DOCUMENTS

| | | | | |
|---|---|---|---|---|
| 4,850,441 | A | * | 7/1989 | Mosdal .................. G01G 17/08 177/136 |
| 5,734,128 | A | * | 3/1998 | Gades .................... G01G 17/08 177/132 |
| 7,598,463 | B2 | * | 10/2009 | Kleinsasser ............ G01G 17/08 119/842 |
| 2004/0144333 | A1 | * | 7/2004 | Finlayson .............. A01K 11/00 119/858 |

* cited by examiner

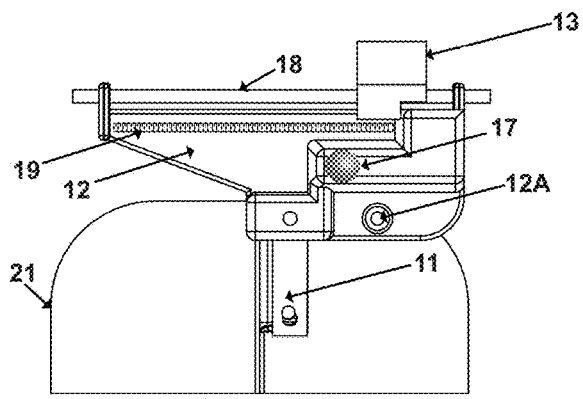
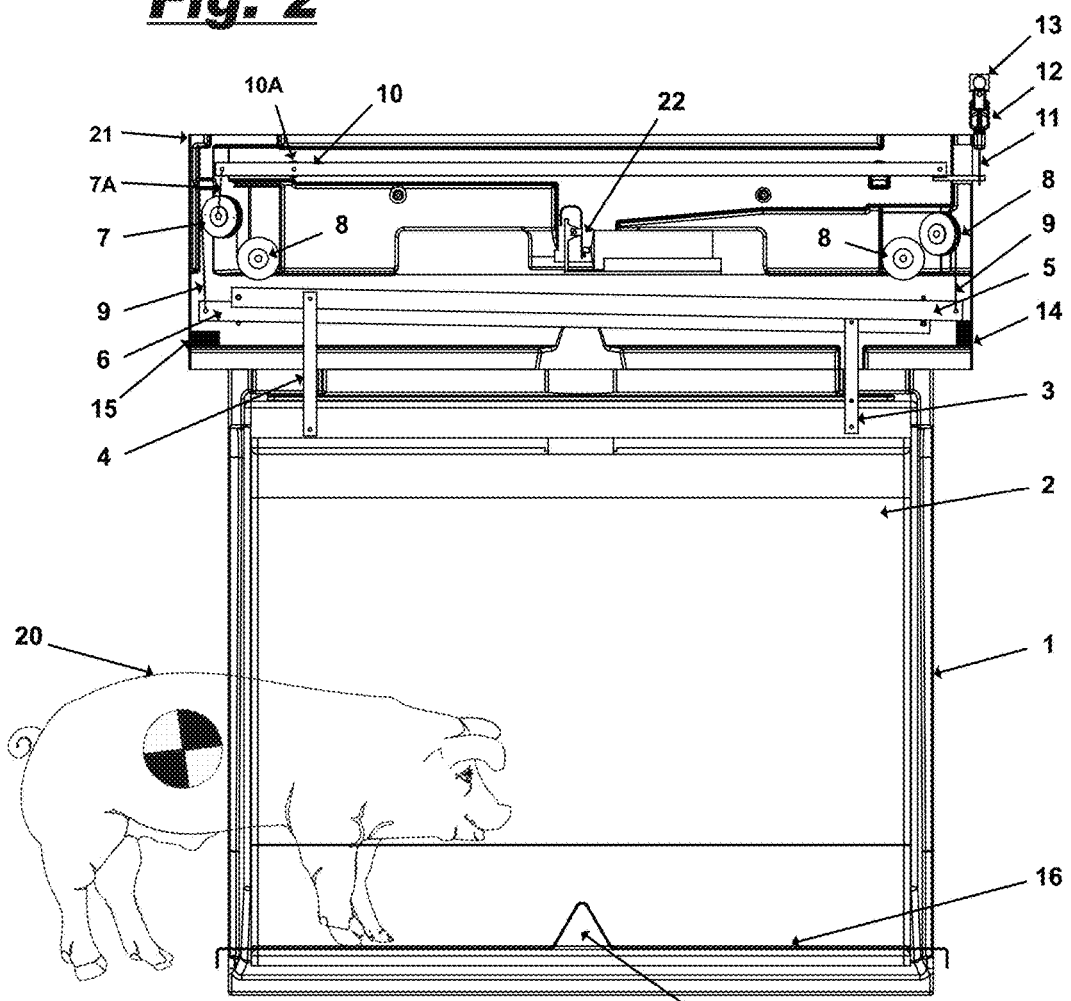

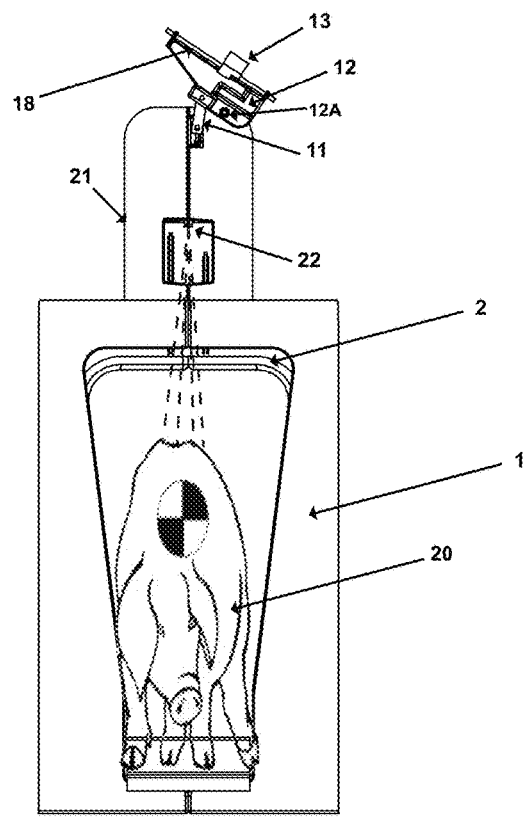
*Fig. 18*
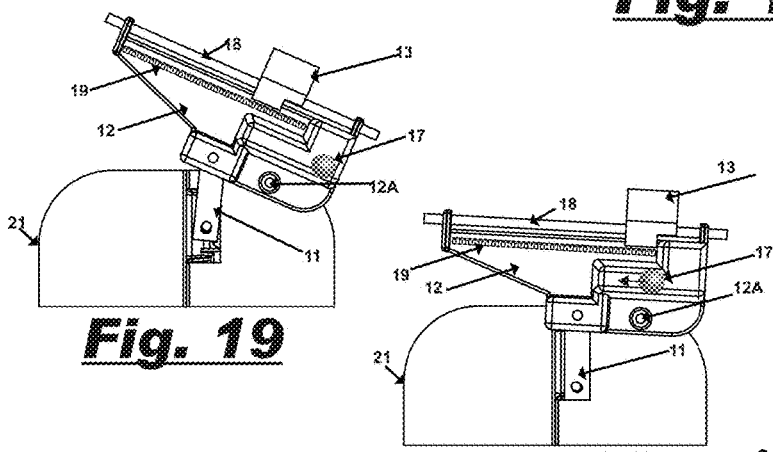
*Fig. 19*
*Fig. 20*
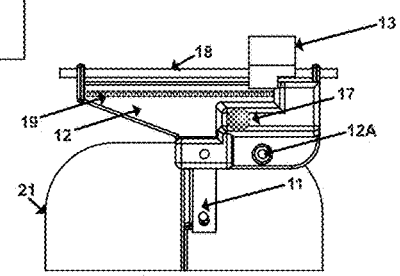
*Fig. 21*

WEIGHT ACTIVATED ANIMAL MARKING SCALE

RELATED APPLICATIONS

This application claims the benefit of U.S. Provisional Patent Application No. 62/299,114 filed on Feb. 24, 2016. The entire content of this related application is incorporated herein by reference.

BACKGROUND OF THE INVENTION

Field of the Invention

The present invention relates generally to livestock production management systems, and in particular, to systems and methods for automatically weighing animals and triggering scale-operated features.

Description of the Related Art

Meat packers and their customers are demanding the production and delivery of market animals with weights that must meet progressively tighter windows for acceptable weights. Marketing animals whose weights fall outside the specified weight ranges usually results in significant deductions from market prices for such underweight or overweight animals.

Historically pig producers selected animals for market by simple visual inspection, relying on pig judging skills to identify market animals. Such methods are neither sufficiently accurate nor reliably consistent for modern markets. The use of single-animal farm scales, such as the Osborne Industries ACCU-ARM scale, is sufficiently accurate to select animals for market. Using such scales has been shown to amply reward the user with a profitable payback at market for both the cost of equipment and labor for weighing. However, the method of individually sorting and weighing animals requires substantial labor and time, two commodities that are often unavailable in modern finishing operations. Furthermore, sorting and weighing animals that fail to meet the marketing range always causes stress and a temporary, but costly interruption to their normal growth.

If large numbers of animals must be inspected, the use of single-animal scales is simply too slow to be practical. Therefore, an automated and accurate sorting method is needed. Such a sorting method can involve automatically weighing and marking animals that exceed a predetermined threshold weight, and then manually sorting off the marked animals into a load out pen. Alternatively, the sorting method can use a different scale-operated feature, such as a sorting gate, which is triggered when an animal exceeds a predetermined threshold weight.

A scale for weighing moving animals is described in U.S. Pat. No. 6,838,625 issued to Ostermann. Ostermann's system includes a break-over beam that can be used with a mechanical balance to set a sorting weight for livestock. As an animal passes over a scale platform, the mechanical balance provides an indication of which animals are over the selected sorting weight. Movement of the mechanical balance can be used to operate a scale-operated feature, such as a sorting control or a marking device.

However, Ostermann's '625 patent does not disclose a particular counterweight assembly for use with the mechanical balance, and conventional counterweight assemblies for scales fail to provide an abrupt triggering mechanism for triggering a scale-operated feature.

There is a need in the industry for an improved mechanical scale weight selection device that overcomes the problems of the prior art described above.

SUMMARY OF THE INVENTION

An object of the present invention is to provide a mechanical scale with a counterweight assembly having a weight selection device that causes an abrupt triggering of a scale-operated feature when a threshold weight is exceeded.

A further object of the present invention is to provide a livestock marking scale with a mechanical counterweight assembly that provides a weight selection device having a freely movable counterweight mass for causing an abrupt triggering of a scale-operated feature.

These and other objects of the present invention are provided by a mechanical scale having a weighing basket with a platform having entrance and exit ends. A hanging assembly for supporting the weighing basket includes a break-over beam. A counterweight assembly is connected to the break-over beam and is adjustable to select a threshold scale weight required to trigger a scale-operated feature, such as a spray marking mechanism. The counterweight assembly has a weight selection device bracket pivotally mounted to the frame assembly about a pivot point, and a freely moveable counterweight mass supported by the bracket. The freely moveable counterweight mass is moveable from a first position to a second position when the threshold scale weight is exceeded in the weighing basket, thereby causing an abrupt triggering of the scale-operated feature when the threshold scale weight is exceeded in the weighing basket. The freely moveable counterweight mass is a rolling spherical member enclosed within a hollow chamber inside the bracket The marking scale weight selection device of the present invention enables the proper operation of a mechanical scale utilizing Ostermann's break-over beam weighing technology disclosed in U.S. Pat. No. 6,838,625. The mechanical scale weight selection device of the present invention allows the counter balance weight to be adjusted to different values and will automatically reduce the counter balance weight when the break-over beam begins to rotate from a horizontal position.

Numerous other objects of the present invention will be apparent to those skilled in this art from the following description wherein there is shown and described embodiments of the present invention, simply by way of illustration of some of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the present invention is made with reference to the accompanying drawings. In the drawings:

FIG. 2 is an elevation view of a weight selection device used in the marking scale shown in FIG. 1.

FIG. 3 is an elevation view of the marking scale with a small animal entering the passageway from the left.

FIG. 18 is a right end view of the marking scale with the large animal in the passageway being sprayed with the marking mechanism.

FIGS. 19 to 21 show a series of elevation views of the weight selection device as the large animal is leaving the scale, with FIG. 19 showing the freely moveable mass in its second position, FIG. 20 showing the freely moveable mass moving from its second position toward its first position as the large animal exits the scale, and FIG. 21 showing the freely moveable mass in its first position.

DETAILED DESCRIPTION OF THE INVENTION

Figure 1:
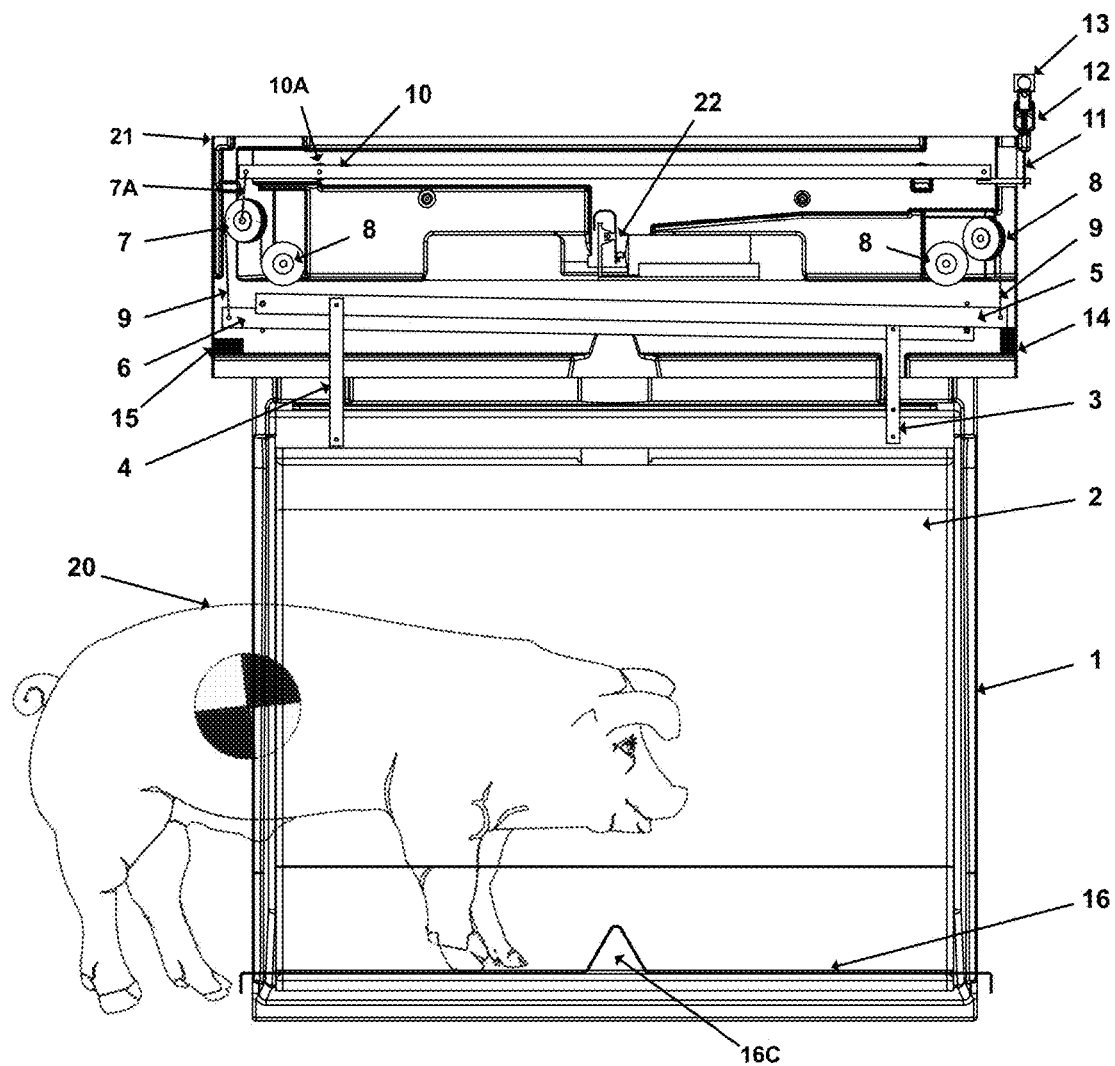
FIG. 1 is a side elevation view of a marking scale according to the present invention.

A first embodiment of the mechanical scale of the present invention is illustrated in FIGS. 1 to 32. The scale is comprised of several different components that are assembled into a passageway where the animal or object being weighed is able to enter and exit from either side of the scale. The orientation of the assembled components is not important and for this description the right entry/exit way is determined by the location of the weight selection device and the left entry/exit way is the opposite side of the passageway.

The scale has a frame assembly that includes a scale outside frame 1 and a top support cover 21. The scale outside frame 1 supports the entire scale mechanism and weighing basket 2. The weighing basket 2 includes a platform having an entrance end and an exit end. The weighing basket 2 is placed inside of the scale outside frame 1. The weighing basket 2 is vertically suspended by a short hanging link 3 located on the top right-hand side of the weighing basket 2. The top left-hand side of the weighing basket 2 is vertically suspended by a long hanging link 4. The short hanging link 3 is fastened and allowed to pivot freely on the right-hand weigh arm 6. The long hanging link 4 is fastened and allowed to pivot freely on the left-hand weigh arm 5. One end of the right-hand weigh arm 6 and one end of the left-hand weigh arm 5 are fastened and allowed to pivot on the top support cover 21, which is mounted on top of the outer frame 1.

The opposite ends of the left-hand weigh arm 5 and the right-hand weigh arm 6 are connected to a wire rope 9, or other flexible connecting member, that is threaded around a series of pulleys 7, 8. The wire rope from the left-hand weigh arm 5 is threaded around a series of three fixed pulleys 8 and culminates at the floating pulley 7. The wire rope 9 from the right-hand weigh arm 6 also culminates at the floating pulley 7. The wire rope 9 is thus continuous from the left-hand weigh arm 5 over the fixed pulleys 8 and the floating pulley 7 to the right-hand weigh arm 6. The fixed pulleys 8 are fastened to the top support cover 21 and allowed to rotate freely as the wire rope 9 moves with the rotation of the left-hand weigh arm 5 and the right-hand weigh arm 6.

When the animal enters/exits the passageway from the left, the left-hand weigh arm 5 will rotate downward allowing the end of the left-hand weigh arm 5 to contact the left-hand weigh arm stop 14. If the animal enters/exits the passageway from the right, the right-hand weigh arm 6 will rotate downward allowing the end of the right-hand weigh arm 6 to contact the right-hand weigh arm stop 15. Contact with these weigh arm stops 14 and 15 is imperative to occur before the opposite weigh arm 5 or 6 rotates upward and contacts any type of restraining point. If the opposing weigh arm that rotates upward comes into contact with a restraining point before the weigh arm 5 or 6 rotates downward and contacts the corresponding stop 14 or 15, the weighing mechanism will amplify the internal forces of the weighing system resulting in erroneous operation of the scale.

The floating pulley 7 is connected to the break-over beam 10 using a connecting link 7a. The connecting link 7a is fastened and allowed to pivot on the end of the break-over beam 10. The opposite end of the break-over beam 10 is connected to the counterweight selection device link 11. The break-over beam 10 is fastened and allowed to pivot at point 10a on the top support cover 21 between the opposite ends of the break-over beam 10.

One end of the counterweight selection device link 11 is fastened to and allowed to pivot on the end of the break-over beam 10. FIG. 2 shows the other end of the counterweight selection device link 11 is fastened to and allowed to pivot on the counterweight selection device bracket 12. The counterweight selection device bracket 12 is fastened to and allowed to pivot at point 12a on the top support cover 21.

The counterweight selection device bracket 12 has a counterweight 13 that is fastened to an adjustment rod 18 which is used to traverse the counterweight 13 parallel to the top of the counterweight selection device bracket 12. The adjustment of the counterweight 13 on the adjustment rod 18 varies the moment force about the fastening pivot point 12a between the counterweight selection device bracket 12 and the top support cover 21. Traversing the counterweight 13 further away from the counterweight selection device bracket 12 pivot point 12a (i.e., toward the left in FIG. 2) increases the downward force acting on the end of the break-over beam 10.

The counterweight selection device bracket 12 has a hollow chamber inside to enclose a counterweight offset roller 17. The counterweight offset roller 17 will traverse the hollow chamber inside of the counterweight selection device bracket 12 as it rotates from the horizontal position. When the counterweight selection device bracket 12 rotates upward because the break-over beam 10 is rotated upward, the counterweight offset roller 17 traverses to the opposite side of the counterweight selection device bracket 12 pivot point 12a. The traversing of the counterweight offset roller 17 immediately reduces the force moment acting on the end of the break-over beam 10 allowing the break-over beam 10 to rotate upward more easily, faster and more abruptly.

The upward rotation of the counterweight selection device bracket 12 will trigger a scale-operated feature, such as a spray marking mechanism or a sorting gate. In the illustrated embodiment, the upward rotation of the counterweight selection device bracket 12 triggers a switch which will activate an actuator 22 to release a pigmented spray onto the back of the animal passing through the weighing platform 16.

Description of Operation:

Small Animal Enter from Left

FIGS. 3 to 7 show the progression of the Marking scale operation as a small animal (pig in this embodiment) enters the passage from the left side. A small animal is defined as an animal that weighs less than the load required to rotate the break-over beam 10 as described previously.

The animal 20 in FIG. 3 enters the passageway from the left and places its front legs on the weighing platform 16. The weight of the animal 20 will cause the left-hand side of the weighing platform 16 to rotate downward causing the left-hand weigh arm 5 to rotate downward and contact the left-hand weigh arm stop 14. This condition continues as the animal 20 center of mass is positioned left of the passageway center 16c.

The acceptable lever ratio of the left-hand and right-hand weigh arms 5 and 6 is between 75 to 1 and 2 to 1. If the ratio is either less or greater than this range, the weighing system will be too sensitive or too structurally unstable to function properly.

Figure 4:
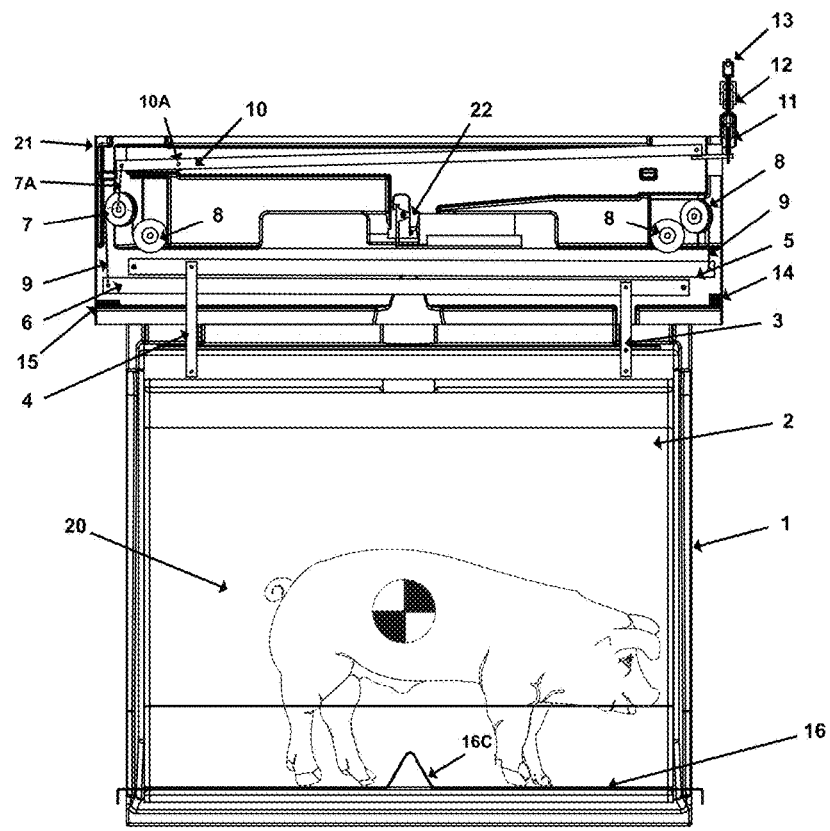
FIG. 4 is an elevation view of the marking scale with the small animal in the center of the passageway.

The animal 20 will continue to enter the passageway until the animal 20 center of mass is centrally located in the passageway. FIG. 4 shows the animal 20 in the center of the passageway. When the animal 20 is in the center of the passageway, the left-hand weigh arm 5 and right-hand weigh arm 6 are horizontal. The load of the animal 20 placed on the weighing platform 16 is transferred to the weighing basket 2 that is supported by the long hanging link 4 and short hanging link 3. At this moment, the forces on the long hanging link 4 and short hanging link 3 are identical resulting in the left-hand weigh arm 5 and right-hand weigh arm 6 being horizontal. The weigh arms 5 and 6 translate the loads through the wire rope 9 through the series of fixed pulleys 8. The total load of the system is combined by addition at the floating pulley 7. The resultant load acting on the floating pulley 7 will be transferred to the end of the break-over beam 10 through the connecting link 7a. Since the animal 20 weight is less than the weight necessary to rotate the break-over beam 10, no rotation of the break-over beam 10 occurs and the system remains stable.

Figure 5:
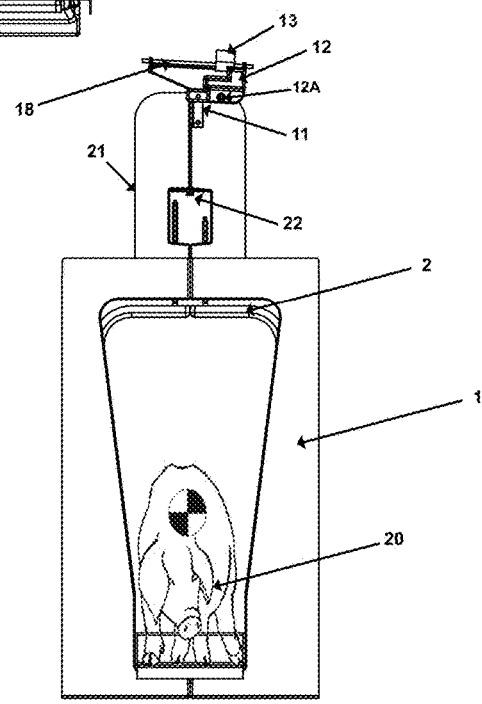
FIG. 5 is a right end view of the marking scale with the small animal in the passageway.
Figure 6:
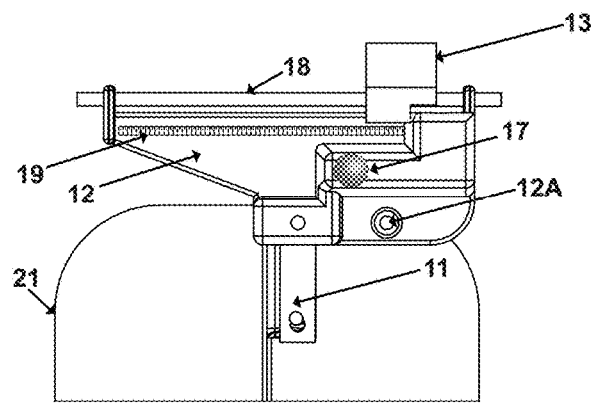
FIG. 6 is an elevation view of the weight selection device with a freely moveable mass in a first position indicating that a threshold weight in the scale has not been exceeded.

FIGS. 5 and 6 show the end view of the marking scale as the animal 20 is exiting the right side. The counterweight selection device bracket 12 remains horizontal and therefore, no spray marking of the animal 20 occurs.

Figure 7:
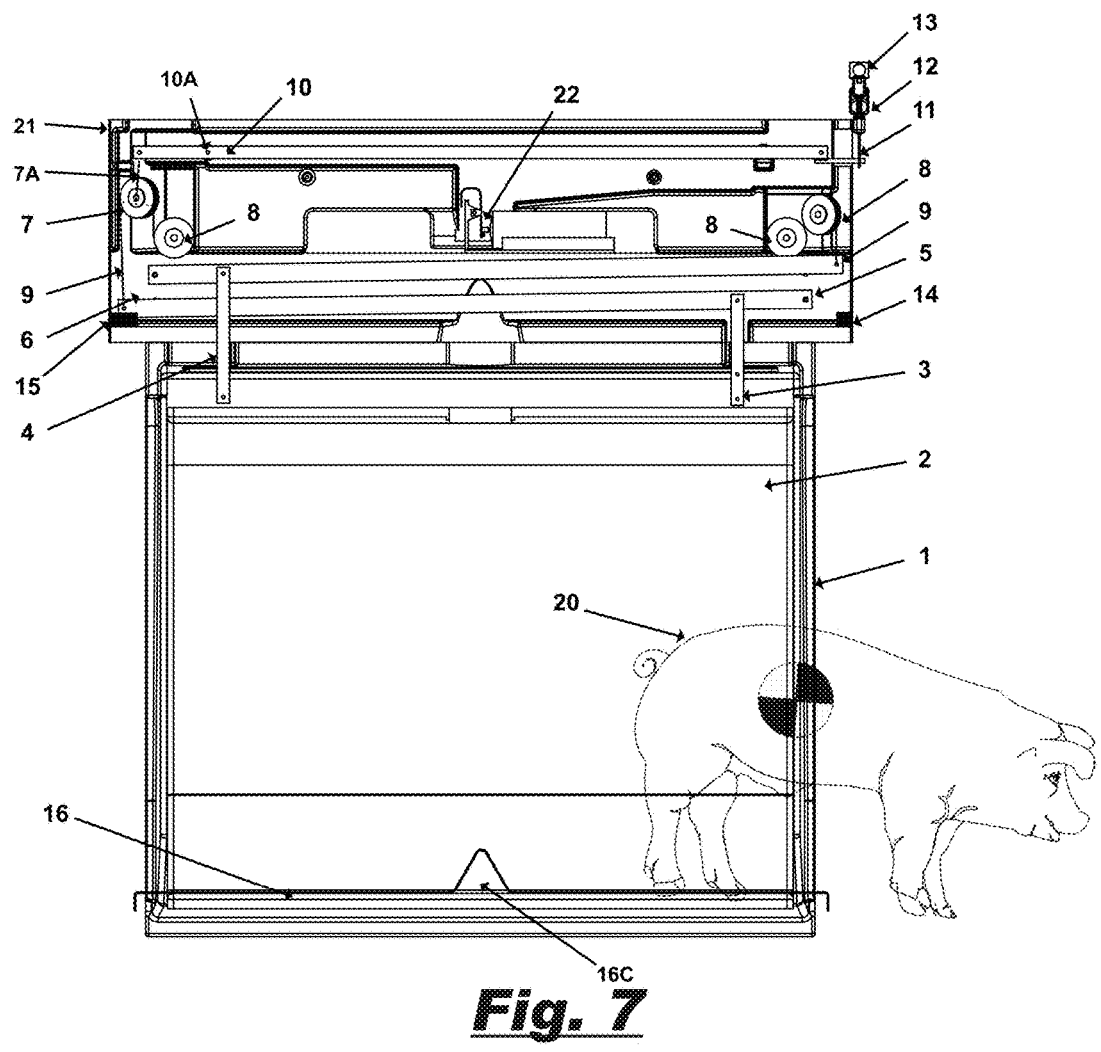
FIG. 7 is an elevation view of the marking scale with the small animal leaving the passageway to the right.
Figure 8:
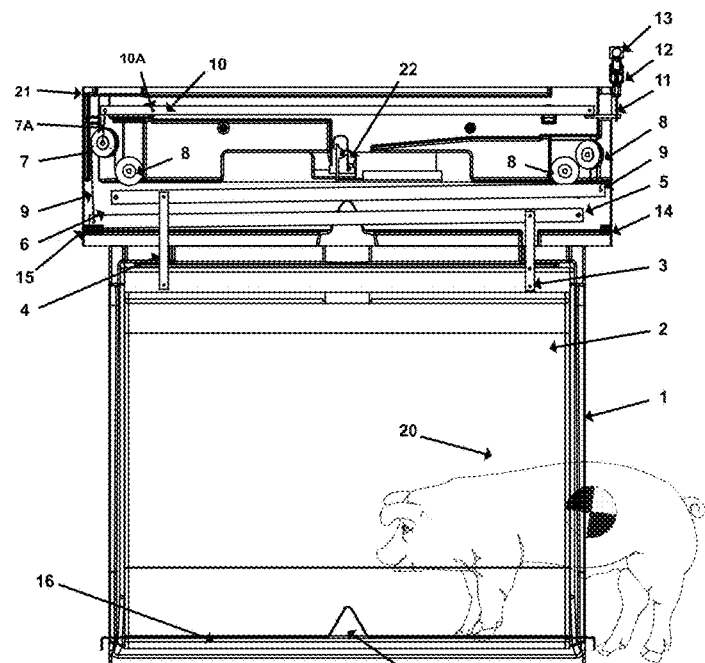
FIG. 8 is an elevation view of the marking scale with a small animal entering the passageway from the right.

The animal 20 will exit the passageway from the right. When the animal 20 center of mass passes to the right of the scale center, the right-hand weigh arm 6 will begin to rotate downward against the right-hand weigh arm stop 15 as shown in FIG. 7.

Small Animal Enter from Right

A similar condition, as described above, occurs when the animal 20 enters from the right side and exits the left side. This condition is shown in FIGS. 8 to 12. The animal 20 in FIG. 8 enters the passageway from the right and places its front legs on the weighing platform 16. The weight of the animal 20 will cause the right-hand side of the weighing platform 16 to rotate downward causing the right-hand weigh arm 6 to rotate downward and contact the right-hand weigh arm stop 15. This condition continues as the animal 20 center of mass is positioned right of the passageway center 16c.

Figure 9:
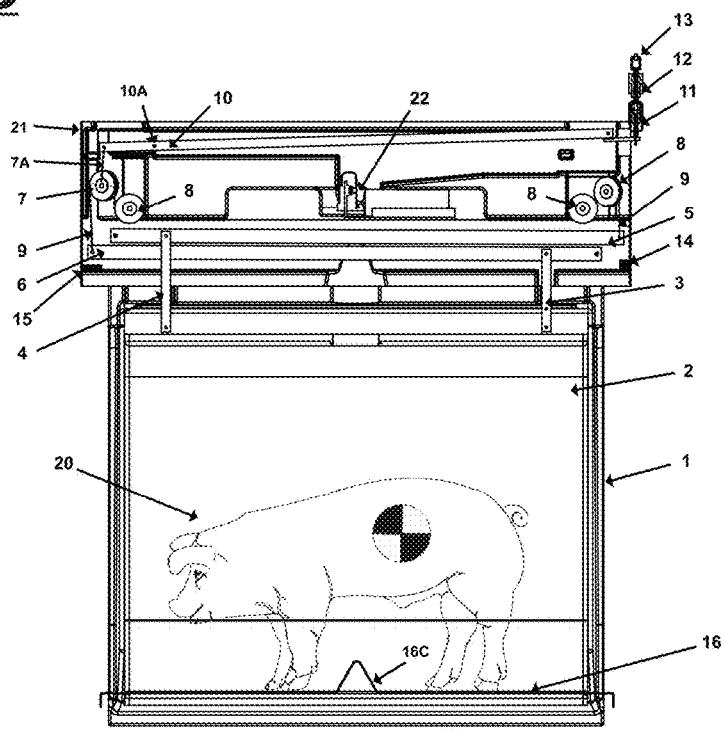
FIG. 9 is an elevation view of the marking scale with the small animal in the center of the passageway.

The animal 20 will continue to enter the passageway until the animal 20 center of mass is centrally located in the passageway. FIG. 9 shows the animal 20 in the center of the passageway. When the animal 20 is in the center of the passageway, the left-hand weigh arm 5 and right-hand weigh arm 6 are horizontal. The load of the animal 20 placed on the weighing platform 16 is transferred to the weighing basket 2 that is supported by the long hanging link 4 and short hanging link 3. At this moment, the forces on the long hanging link 4 and short hanging link 3 are identical resulting in the left-hand weigh arm 5 and right-hand weigh arm 6 being horizontal. The weigh arms 5 and 6 translate the loads through the wire rope 9 through the series of fixed pulleys 8. The total load of the system is combined by addition at the floating pulley 7. The resultant load acting on the floating pulley 7 will be transferred to the end of the break-over beam 10 through the connecting link 7a.

Since the animal 20 weight is less than the weight necessary to rotate the break-over beam 10, no rotation of the break-over beam 10 occurs and the system remains stable.

Figure 10:
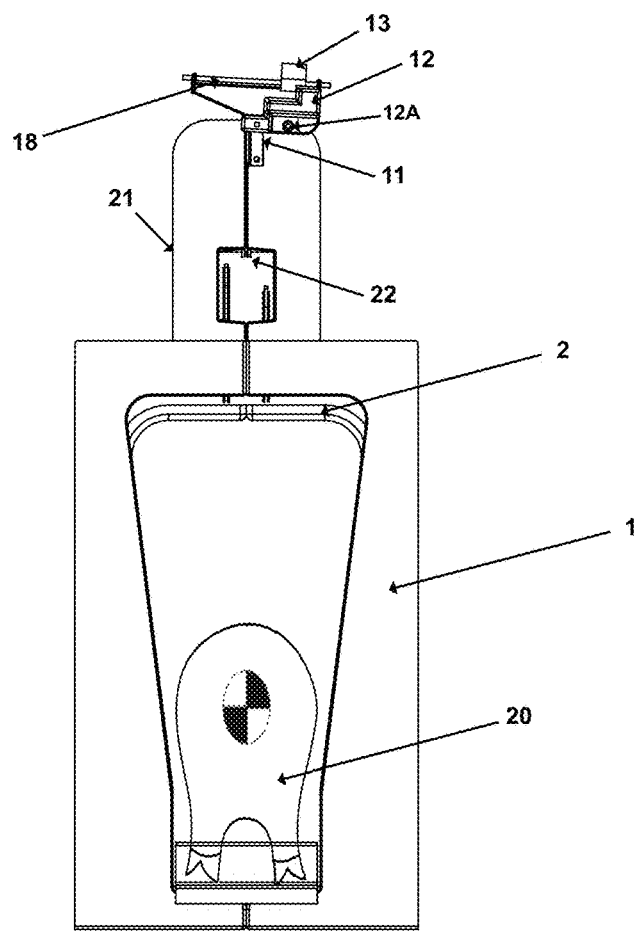
FIG. 10 is a right end view of the marking scale with the small animal in the passageway.
Figure 11:
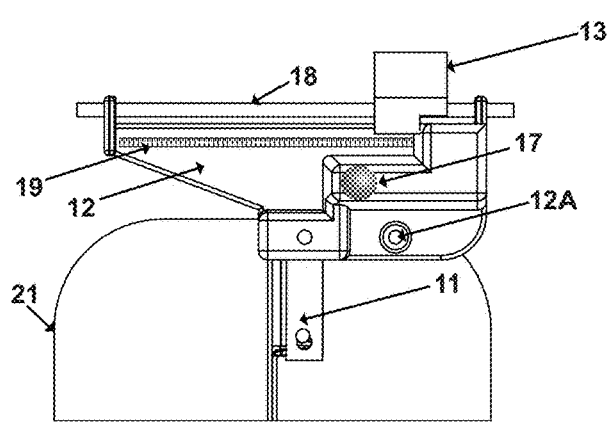
FIG. 11 is an elevation view of the weight selection device with the freely moveable mass in its first position indicating that the threshold weight in the scale has not been exceeded.

FIGS. 10 and 11 show the end view of the marking scale as the animal 20 is exiting the left side. The counterweight selection device bracket 12 remains horizontal and therefore, no spray marking of the animal 20 occurs.

Figure 12:
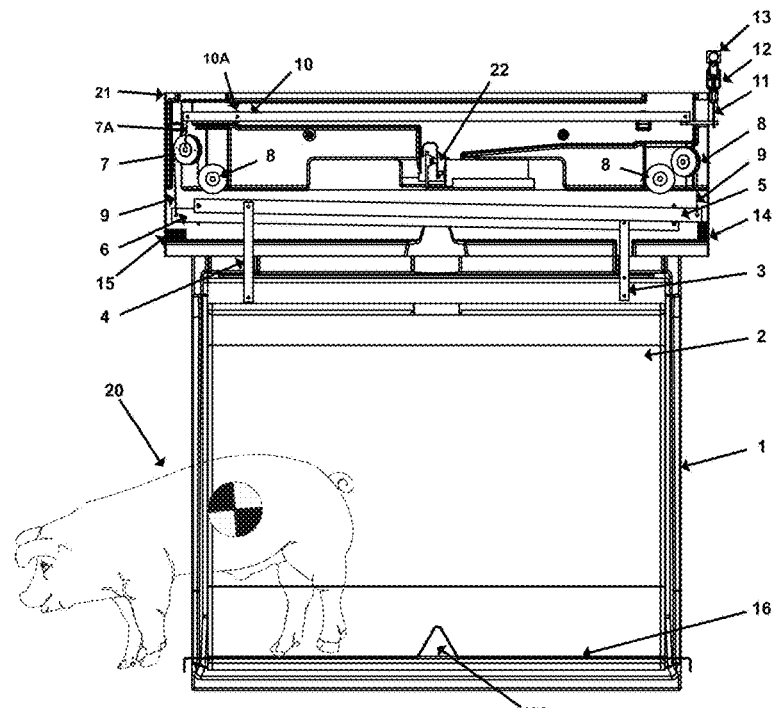
FIG. 12 is an elevation view of the marking scale with the small animal leaving the passageway to the left.

The animal 20 will exit the passageway from the left. When the animal 20 center of mass passes to the left of the scale center, the left-hand weigh arm 5 will begin to rotate downward against the left-hand weigh arm stop 14 as shown in FIG. 12.

Large Animal Enter from Left

FIGS. 13 to 20 show the progression of the Marking scale operation as a large animal (pig in this embodiment) enters the passage from the left side. A large animal is defined as an animal that weighs more than the load required to rotate the break-over beam 10 as described previously. In other words, the weight of the large animal exceeds the predetermined threshold weight set by the weight selection device.

Figure 13:
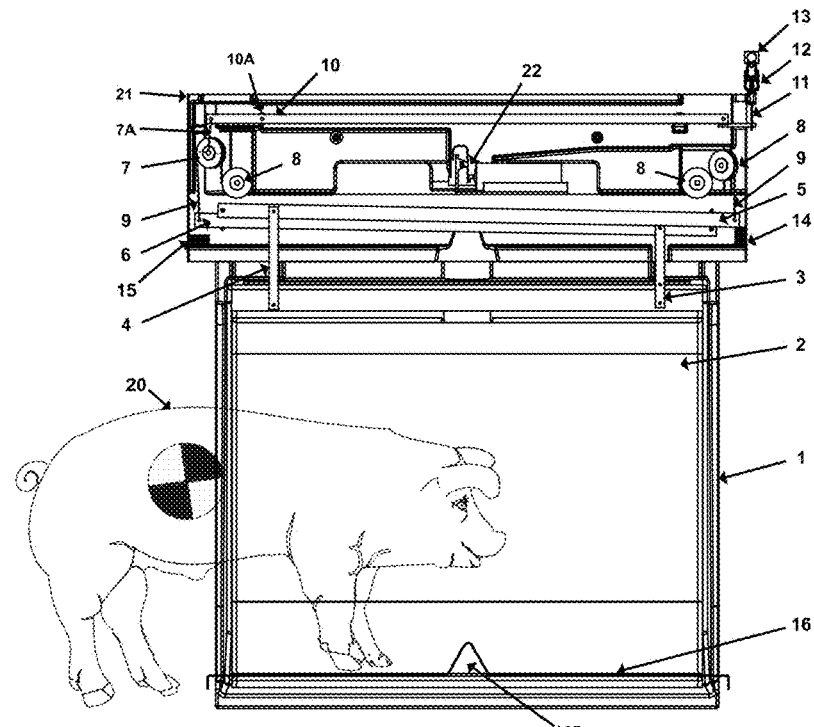
FIG. 13 is an elevation view of the marking scale with a large animal entering the passageway from the left.

The animal 20 in FIG. 13 enters the passageway from the left and places its front legs on the weighing platform 16. The weight of the animal 20 will cause the left-hand side of the weighing platform 16 to rotate downward causing the left-hand weigh arm 5 to rotate downward and contact the left-hand weigh arm stop 14. This condition continues as the animal 20 center of mass is positioned left of the passageway center 16c.

Figure 14:
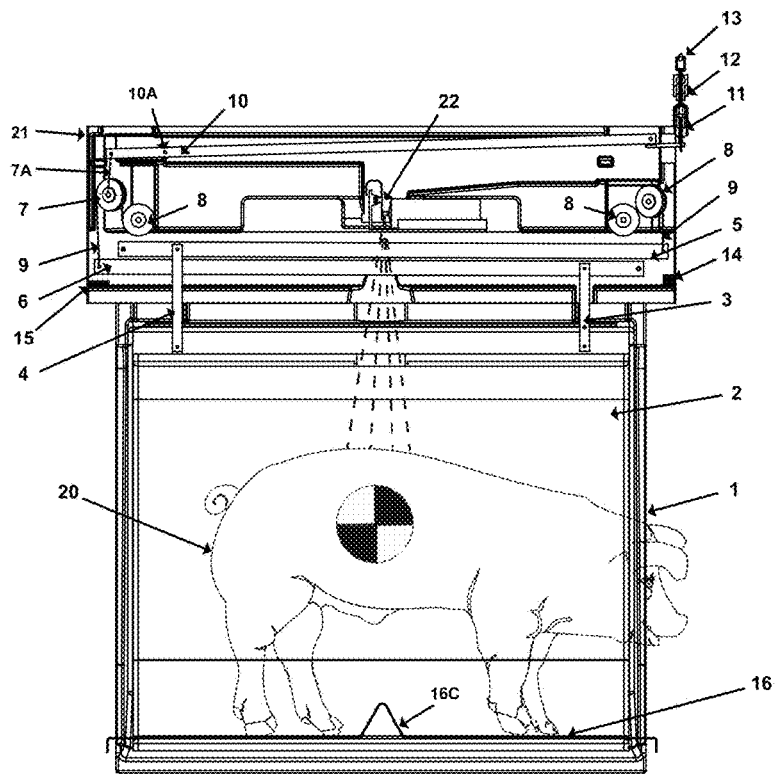
FIG. 14 is an elevation view of the marking scale with the large animal in the center of the passageway and a marking mechanism applying a pigment to the back of the animal.
Figure 15:
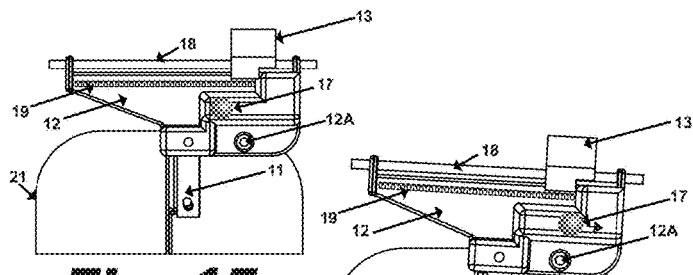
FIGS. 15 to 17 show a series of elevation views of the weight selection device, with FIG. 15 showing the freely moveable mass in its first position, FIG. 16 showing the freely moveable mass moving from its first position toward a second position after a threshold weight in the scale is exceeded, and FIG. 17 showing the freely moveable mass in its second position.

The animal 20 will continue to enter the passageway until the animal 20 center of mass is centrally located in the passageway. FIG. 14 show the animal 20 in the center of the passageway. When the animal 20 is in the center of the passageway, the left-hand weigh arm 5 and right-hand weigh arm 6 are horizontal. The load of the animal 20 placed on the weighing platform 16 is transferred to the weighing basket 2 that is supported by the long hanging link 4 and short hanging link 3. At this moment, the forces on the long hanging link 4 and short hanging link 3 are identical resulting in the left-hand weigh arm 5 and right-hand weigh arm 6 being horizontal. The weigh arms 5 and 6 translate the loads through the wire rope 9 through the series of fixed pulleys 8. The total load of the system is combined by addition at the floating pulley 7. The resultant load acting on the floating pulley 7 will be transferred to the end of the break-over beam 10 through the connecting link 7a.

Figure 16:
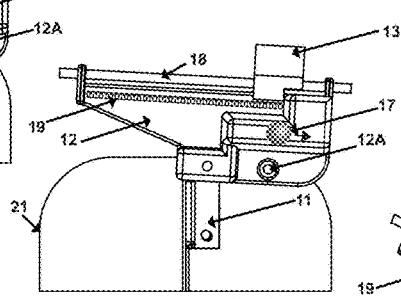
Figure 17:
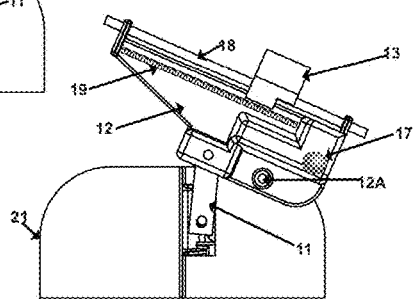

Since the animal 20 weight is more than the weight necessary to rotate the break-over beam 10, the right-hand end of the break-over beam 10 begins to rotate upward. The upward rotation of the break-over beam 10 will cause the counterweight selection device bracket 12 to begin rotating upward (i.e., clockwise as viewed in FIG. 15). This upward rotation will cause the counterweight offset roller 17 to begin translating to the right, as shown in FIGS. 16 and 17, causing the load from the bracket 12 acting on the end of the break-over beam 10 to decrease abruptly, allowing the break-over beam 10 to rotate upward more easily and quickly. The upward rotation of the break-over beam 10 activates an actuator 22 of a marking mechanism that releases a pigmented spray onto the back of the animal 20 passing through the weighing platform 16, as illustrated in FIG. 14.

FIGS. 18 to 21 show the end view of the marking scale as the animal 20 is spray marked and exiting the right side. The counterweight selection device bracket 12 will rotate downward as the animal 20 exits the weight platform 16. The downward rotation of the counterweight selection device bracket 12 will result in the counterweight offset roller 17 to begin translating to the left. The counterweight offset roller 17 will return to the home position when the counterweight selection device bracket 12 becomes horizontal.

Figure 22:
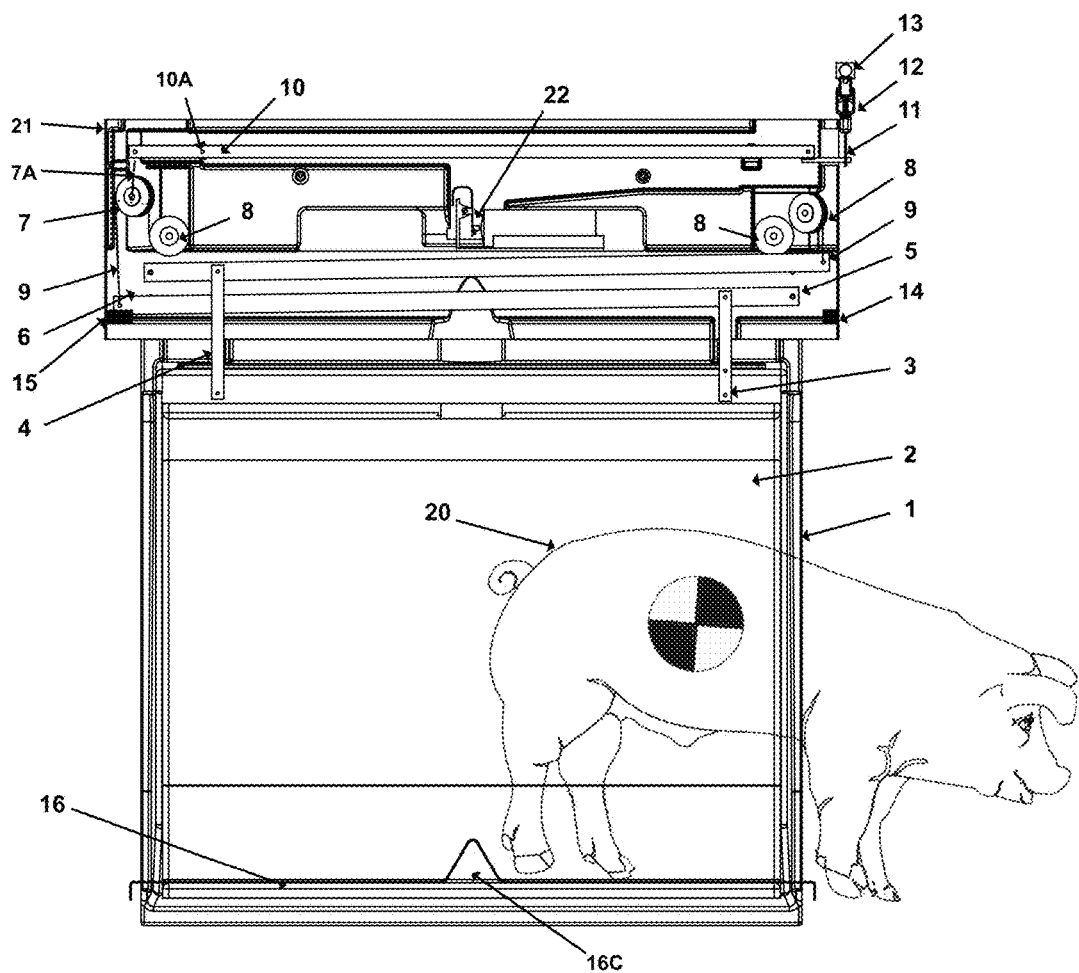
FIG. 22 is an elevation view of the marking scale with the large animal leaving the passageway to the right.
Figure 23:
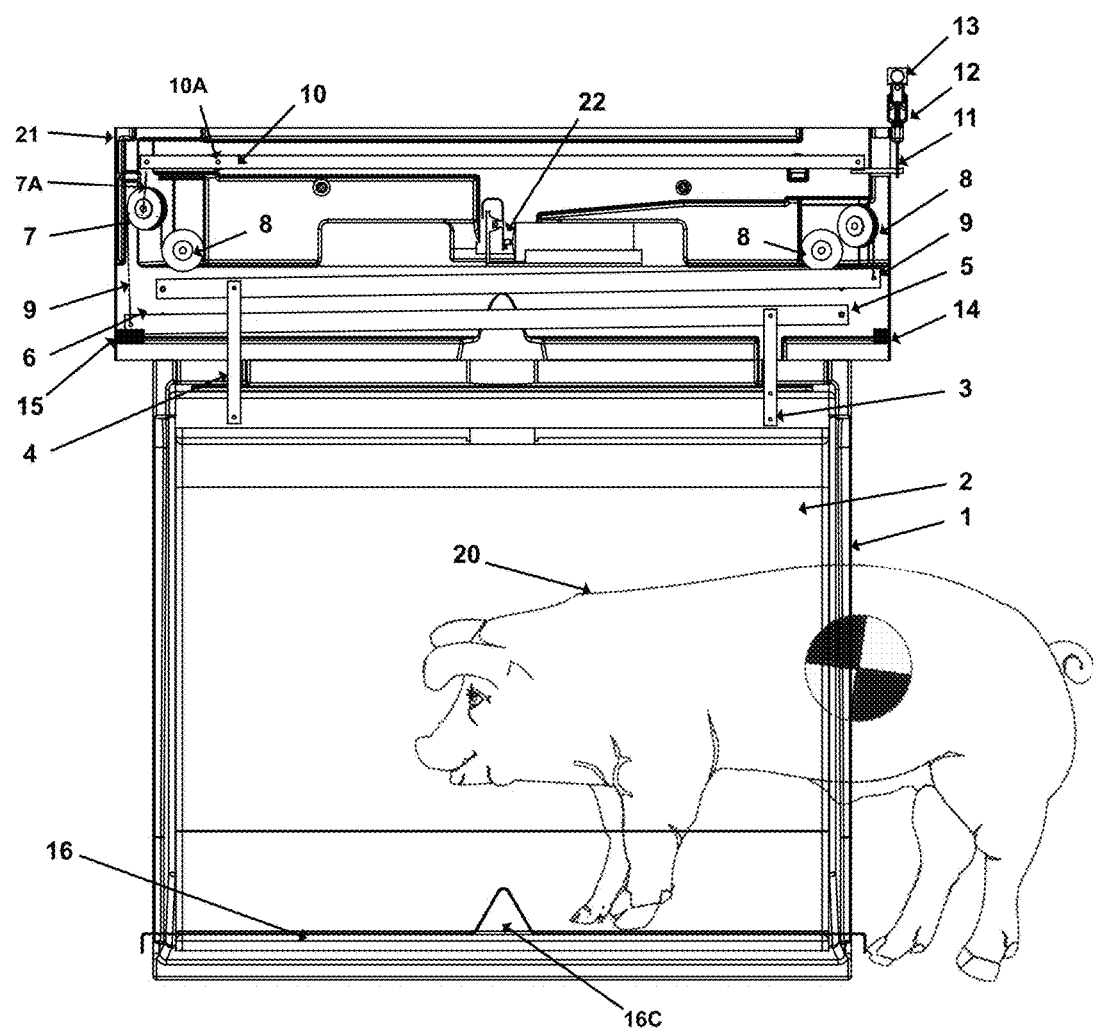
FIG. 23 is an elevation view of the marking scale with a large animal entering the passageway from the right.

The animal 20 will exit the passageway from the right. When the animal 20 center of mass passes to the right of the scale center 16c, the right-hand weigh arm 6 will begin to rotate downward against the right-hand weigh arm stop 15, as shown in FIG. 22.

Large Animal Enter from Right

A similar condition, as described above for the large animal, occurs when the animal 20 enters from the right side and exits the left side. This condition is shown in FIGS. 23 to 27. The animal 20 in FIG. 23 enters the passageway from the right and places its front legs on the weighing platform 16. The weight of the animal 20 causes the right-hand side of the weighing platform 16 to rotate downward causing the right-hand weigh arm 6 to rotate downward and contact the right-hand weigh arm stop 15. This condition continues as the animal 20 center of mass is positioned left of the passageway center 16c.

Figure 24:
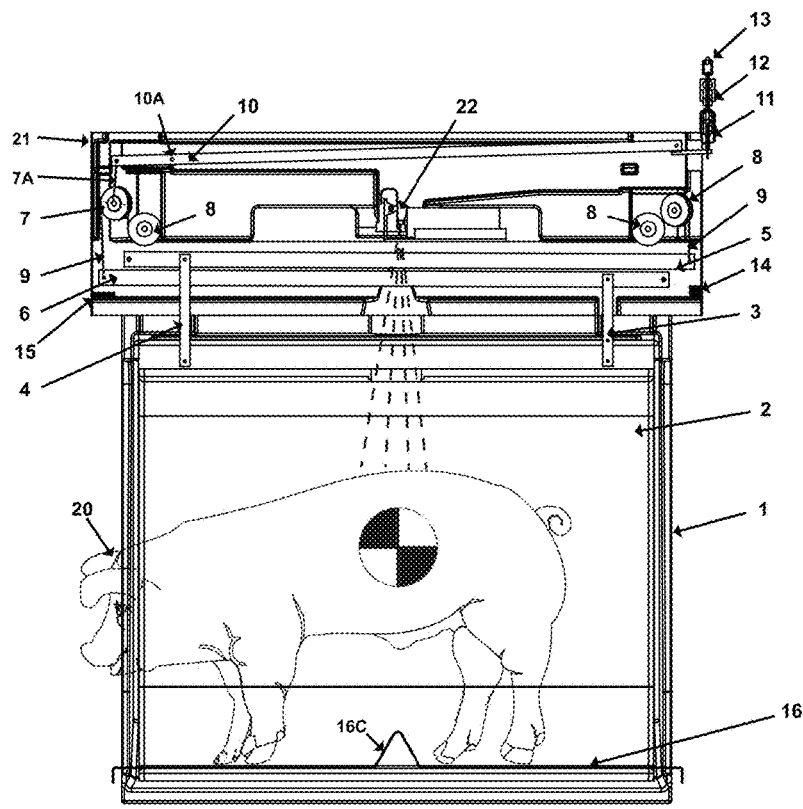
FIG. 24 is an elevation view of the marking scale with the large animal in the center of the passageway and a marking mechanism applying a pigment to the back of the animal.

The animal 20 will continue to enter the passageway until the animal 20 center of mass is centrally located in the passageway. FIG. 24 shows the animal 20 in the center of the passageway. When the animal 20 is in the center of the passageway, the left-hand weigh arm 5 and right-hand weigh arm 6 are horizontal. The load of the animal 20 placed on the weighing platform 16 is transferred to the weighing basket 2 that is supported by the long hanging link 4 and short hanging link 3. At this moment, the forces on the long hanging link 4 and short hanging link 3 are identical resulting in the left-hand weigh arm 5 and right-hand weigh arm 6 being horizontal. The weigh arms 5 and 6 translate the loads through the wire rope 9 through the series of fixed pulleys 8. The total load of the system is combined by addition at the floating pulley 7. The resultant load acting on the floating pulley 7 will be transferred to the end of the break-over beam 10 through the connecting link 7a.

Figure 25:
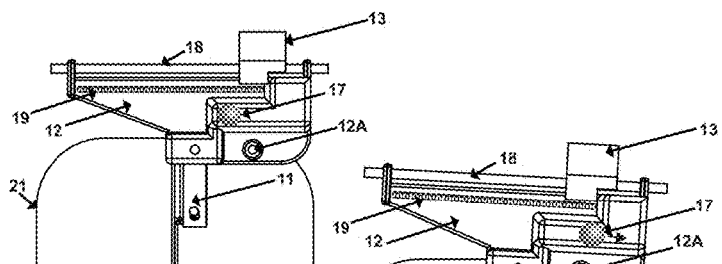
FIGS. 25 to 27 show a series of elevation views of the weight selection device, with FIG. 25 showing the freely moveable mass in its first position, FIG. 26 showing the freely moveable mass moving from its first position toward a second position after a threshold weight in the scale is exceeded, and FIG. 27 showing the freely moveable mass in its second position.
Figure 26:
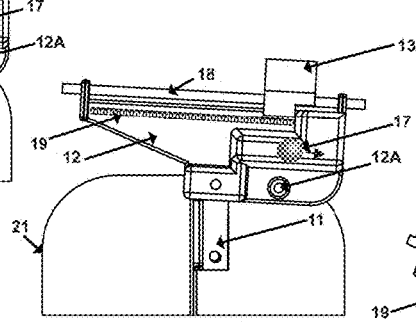
Figure 27:
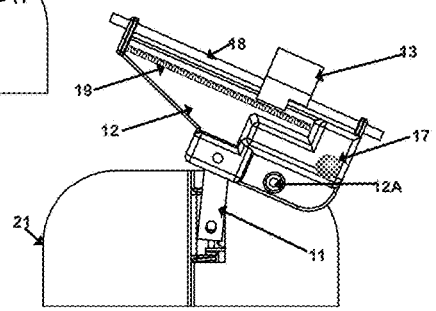
Figure 28:
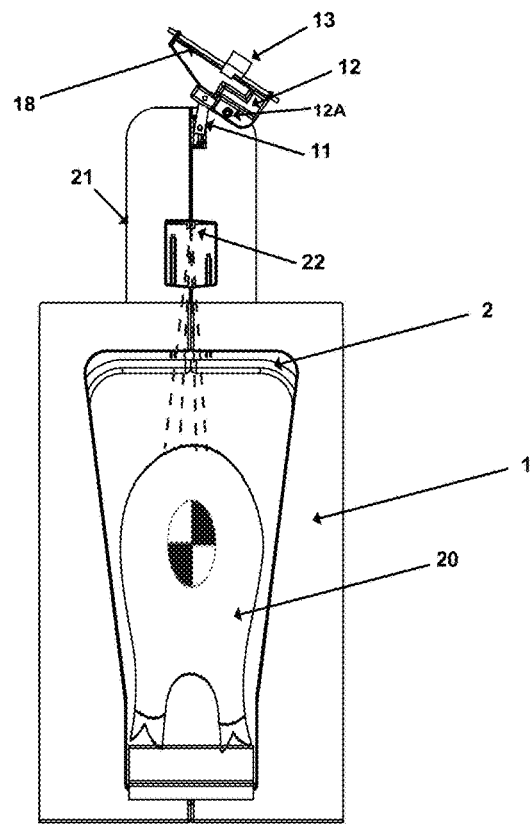
FIG. 28 is a right end view of the marking scale with the large animal in the passageway being sprayed with the marking mechanism.
Figure 29:
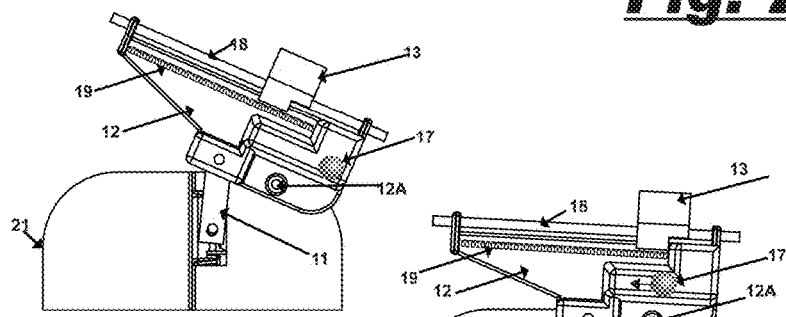
FIGS. 29 to 31 show a series of elevation views of the weight selection device as the large animal is leaving the scale, with FIG. 29 showing the freely moveable mass in its second position, FIG. 30 showing the freely moveable mass moving from its second position toward its first position as the large animal exits the scale, and FIG. 31 showing the freely moveable mass in its first position.

Since the animal 20 weight is more than the weight necessary to rotate the break-over beam 10, the break-over beam 10 begins to rotate upward (i.e., counterclockwise as shown in FIG. 24). The upward rotation of the break-over beam 10 will cause the counterweight selection device bracket 12 to begin rotating upward (i.e., clockwise as shown in FIG. 25). This upward rotation will cause the counterweight offset roller 17 to begin translating to the right, as shown in FIGS. 26 and 27, causing the load acting on the end of the break-over beam 10 to abruptly decrease, allowing the break-over beam 10 to rotate upward more easily and quickly. The upward rotation of the break-over beam 10 will activate an actuator 22 that will release a pigmented spray onto the back of the animal passing through the weighing platform 16, as illustrated in FIG. 24.

Figure 30:
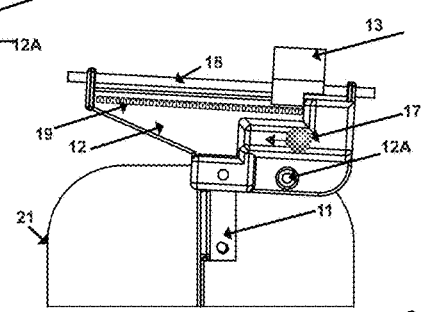
Figure 31:
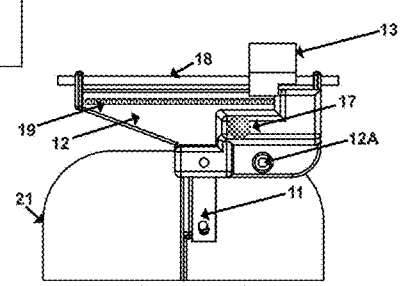

FIGS. 28 to 31 show the end view of the marking scale as the animal 20 is spray marked and exiting the right side. The counterweight selection device bracket 12 will rotate downward (i.e., counterclockwise as shown in FIG. 30) as the animal 20 exits the weight platform 16. The downward rotation of the counterweight selection device bracket 12 will result in the counterweight offset roller 17 to begin translating to the left. The counterweight offset roller 17 will return to the home position when the counterweight selection device bracket 12 becomes horizontal.

Figure 32:
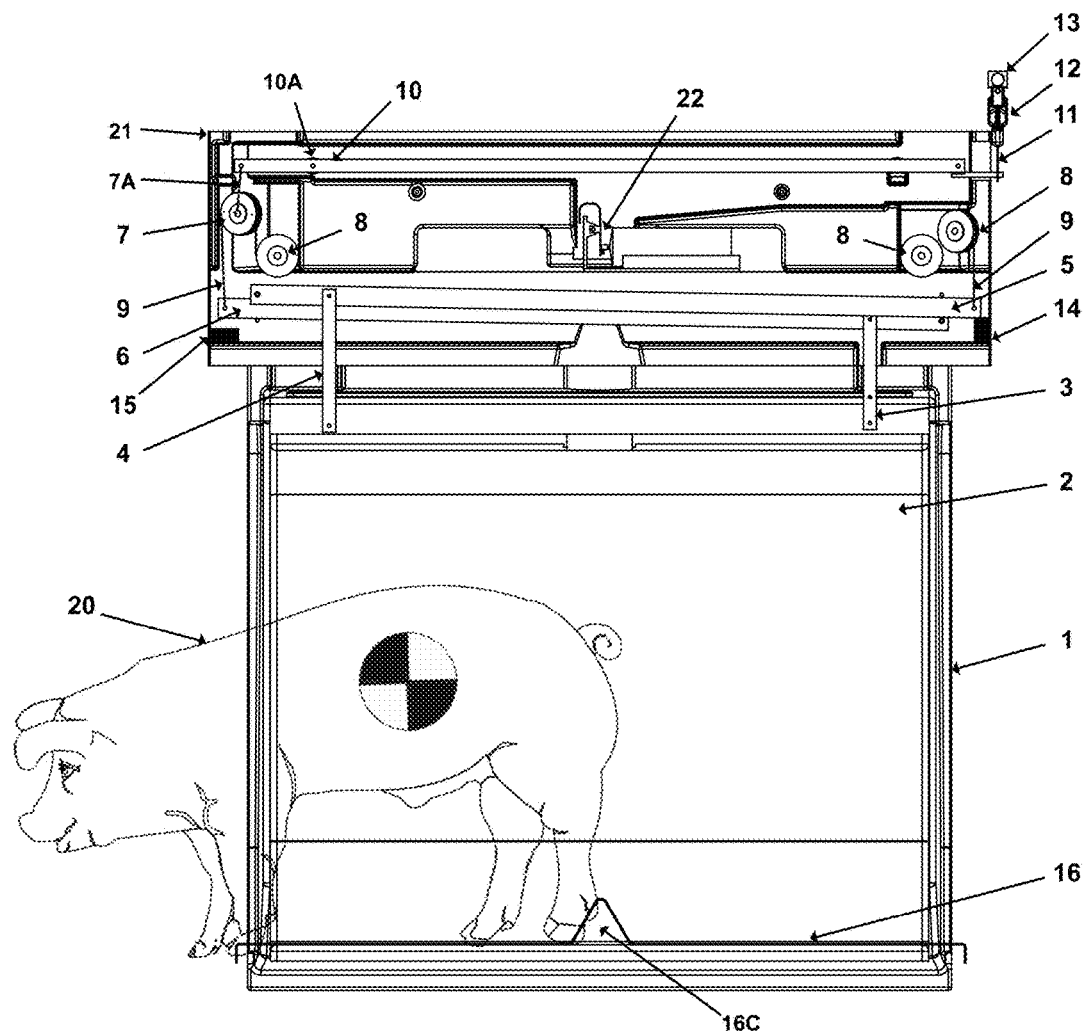
FIG. 32 is an elevation view of the marking scale with the large animal leaving the passageway to the left.

The animal 20 will exit the passageway from the left. When the animal 20 center of mass passes to the left of the scale center 16c, the left-hand weigh arm 5 will begin to rotate downward against the left-hand weigh arm stop 14 as shown in FIG. 32.

Problems Solved by Invention

The current invention solves a major problem with the operation of the break-over beam as presented in Ostermann's U.S. Pat. No. 6,838,625. Any mechanical system that requires translation of forces and rotations of a mechanical member has energy losses in the form of friction. This friction results in additional forces or movement needed to overcome the losses which prevent proper operation.

Figure 33:
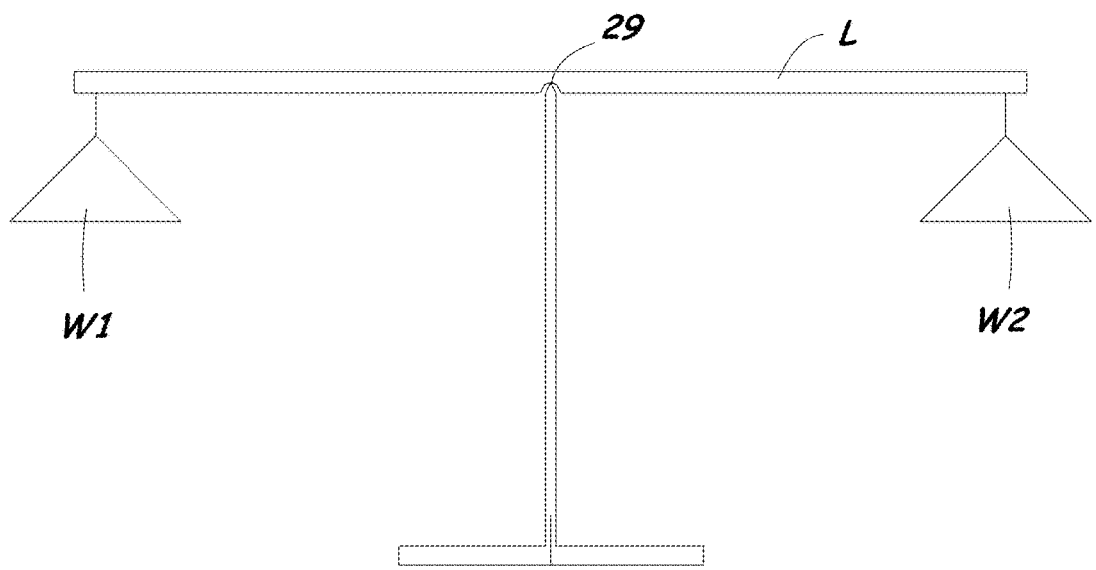
FIG. 33 is a diagram of a balanced system with a simple center pivot to illustrate a principle of the present invention.

A balanced system with a simple center pivot 29 as illustrated in FIG. 33 has only one point of mechanical loss in the form of friction. If this system did not have any losses, the heavier weight W1 or W2 will continue to rotate the lever L downward until the pivot 29 becomes dislodged or contacts a rotational stop mechanism.

However, in the application of the Ostermann patented break-over beam system in the mechanical scale of the present invention, the system has several points of translation and rotation of forces that result in energy losses in the mechanical system. Therefore, additional loading of the members is necessary to overcome these friction losses.

The system is further impaired by the use of lever ratios to convert heavier loads to more manageable lighter loads for counterweight selection and measurement. In the current invention, the acceptable lever ratio is between 75 to 1 and 2 to 1. The higher ratio causes the mechanical weighing system to be more sensitive to loading and consequently more sensitive to losses. The lower lever ratios create a mechanical system that must be constructed more rigidly and stronger. Both extremes create problems with proper operation of the marking scale system.

The current invention solves these problems by offsetting the additional loads that are needed to overcome the fiction losses of the multiple translation and rotation system used in the marking scale.

The primary principle of the present invention is the translation of the counterweight roller 17 which translates horizontally across the counterweight selection device bracket 12. This action is initiated when the forces acting on the break-over beam 10 cause upward movement of the end of the break-over beam connected to the bracket 12. This upward movement then causes the counterweight selection device bracket 12 to rotate upward causing the counterweight roller 17 to roll towards or to the other side of the pivot 12a of the counterweight selection device bracket 12, effectively reducing the force needed to rotate the break-over beam 10.

The importance of applying the counterweight roller 17 movement to this system is to overcome the friction losses of the sensitive lever system allowing the marking scale system to work properly with a very small change (errors) in loading of the weighing platform 16. This results in more accurate marking as the pre-set weights on the counterweight selection device bracket 12 are more accurate. Without the counterweight roller 17 applied, much more weight is necessary on the weighing platform 16 to activate the marking scale. This additional load causes greater error in the marking system.

Figure 34:
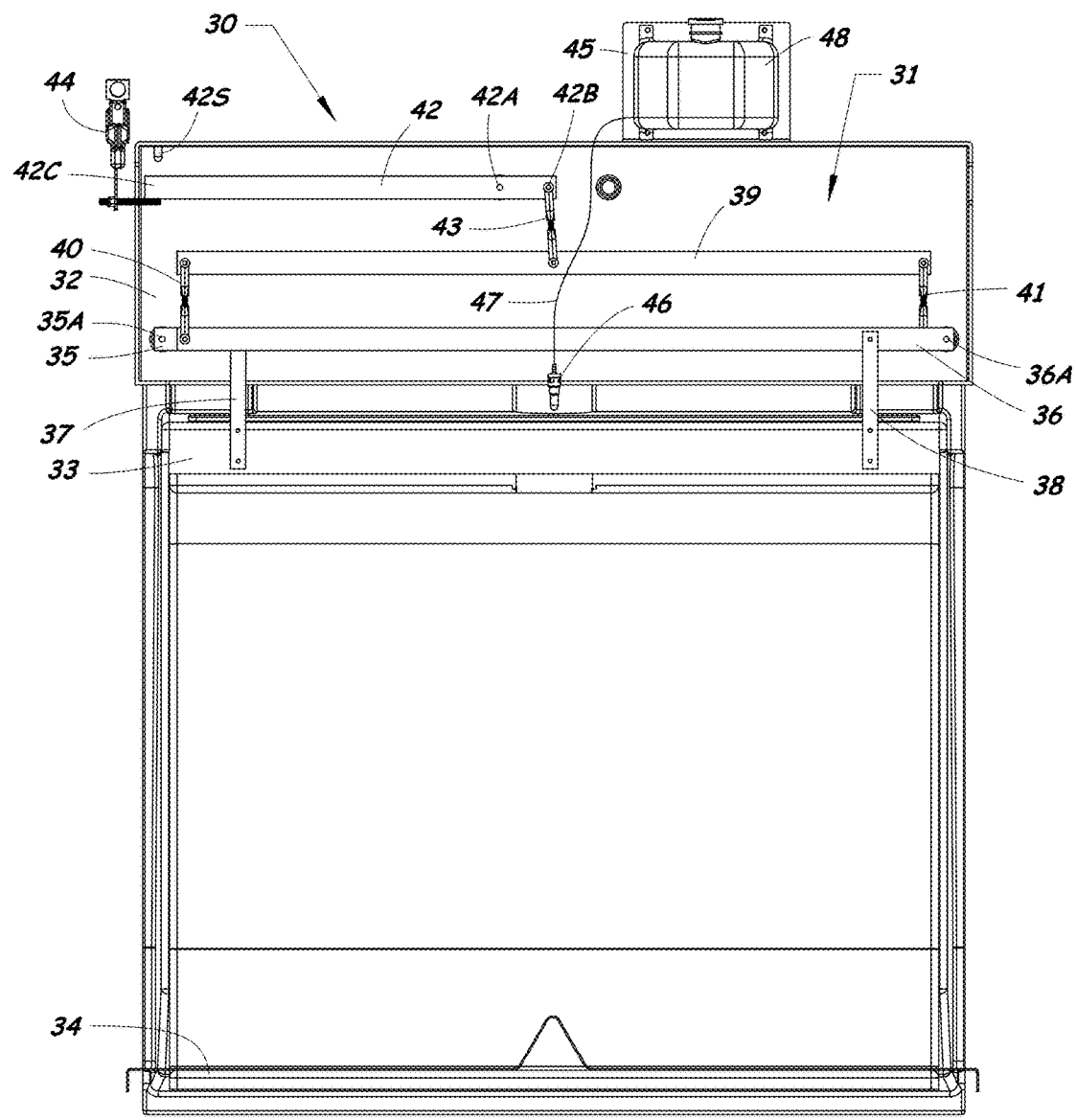
FIG. 34 is an elevation view of a marking scale 30 according to another embodiment of the present invention in which the weighing mechanism has weigh bars linked together.

FIG. 34 illustrates a marking scale 30 according to another embodiment of the present invention. The marking scale 30 in this embodiment uses a weighing mechanism 31 with weigh bars linked together, instead of using a cable and pulley system. The weighing mechanism 31 in this embodiment is described in Applicant's copending U.S. patent application Ser. No. 15/269,914 filed on Sep. 19, 2016, the content of which is incorporated herein by reference.

The marking scale 30 in FIG. 34 includes an outer frame 32 and an inner basket 33 with a weighing platform 34 supported from the frame 32 by the weighing mechanism 31. The weighing mechanism 31 has first and second lower weigh arms 35, 36 pivotally connected at points 35A, 36A to the frame 32. The lower weigh arms 35, 36 are arranged side-by-side. First and second hanging link members 37, 38 are connected between the first and second lower weigh arms 35, 36 and the weighing platform 34. The first and second hanging link members 37, 38 are spaced apart from each other in a longitudinal direction. A middle weigh bar 39 is positioned above the lower weigh arms 35, 36. Third and fourth hanging link members 40, 41 are pivotally connected between the first and second lower weigh arms 35, 36 and respective ends of the middle weigh bar 39. An upper weigh arm 42 is pivotally connected to the frame 32 at point 42A. A fifth link 43 is pivotally connected between an inner end 42B of the upper weigh arm 42 and a midpoint 39A on the middle weigh bar 39.

An adjustable counterweight mechanism 44 is connected to an outer end 42C of the upper weigh arm 42. The counterweight mechanism 44 is equipped with the same counterweight selection device bracket 12 and counterweight roller 17 as in the embodiment described above and illustrated in FIG. 2.

The lower weigh arms 35, 36, middle weigh bar 39, the link members 37, 38, and the link members 40, 41 allow the scale platform weight to be transferred via the link 43 to the upper weigh arm 42. The pivot points 35A, 36A for the lower weigh arms 35, 36, and the pivot point 42A for the upper weigh arm 42 are arranged to reduce the amount of force needed to be applied to the counterweight mechanism 44 at the outer end of the upper weigh arm 42 so that the counterweight mechanism 44 need only have a fraction of the mass of the animals to be weighed on the scale 30.

A spray mechanism 45 has a spray nozzle 46 located above the center of the marking scale 30. The spray mechanism 45 is provided to selectively mark animals that pass through the scale 30. The spray nozzle 46 is connected by a tube 47 to a spray pump and reservoir 48 located on top of the scale 30 for convenient inspection and maintenance. When the pre-set weight of the marking scale 30 is exceeded by the animal being weighed, the counterweight offset roller 17 rolls from its first position to its second position, causing the load acting on the end 42C of the break-over beam to decrease abruptly. The upward movement of the end 42C of the beam 42 triggers a switch 42S or actuator or the like, which activates the spray mechanism 45 to distribute a liquid dye on the back of the animal passing through the scale 30. For example, the beam 42 can be arranged to trigger the spray mechanism 45, upon abrupt upward movement of the end 42C of the beam 42 into engagement with the switch 42S.

While the invention has been specifically described in connection with specific embodiments thereof, it is to be understood that this is by way of illustration and not of limitation, and the scope of the appended claims should be construed as broadly as the prior art will permit.

What is claimed is:

1. A scale comprising:
   a weighing basket having a platform with an entrance end and an exit end;
   a frame assembly for supporting said weighing basket;

a hanging assembly for hanging said weighing basket from said frame assembly, said hanging assembly comprising a break-over beam pivotally connected to said frame assembly; and a counterweight assembly connected to said break-over beam, said counterweight assembly being adjustable to select a threshold scale weight required to trigger a scale-operated feature;

said counterweight assembly comprising a weight selection device bracket pivotally mounted to said frame assembly about a pivot point, and a freely moveable counterweight mass supported by said bracket and moveable relative to said pivot point from a first position to a second position when said threshold scale weight is exceeded in said weighing basket, wherein said counterweight mass effectively reduces the threshold scale weight upon movement from said first position to said second position thereby causing an abrupt triggering of said scale-operated feature when said threshold scale weight is exceeded in said weighing basket.

2. The scale according to claim 1, wherein said scale-operated feature is a marking mechanism for releasing a pigmented spray onto an animal weighed by said scale.

3. The scale according to claim 2, wherein said marking mechanism is located above said weighing basket and arranged to apply the pigmented spray onto a back of an animal located on said platform.

4. The scale according to claim 1, wherein said freely moveable counterweight mass is a rolling spherical member.

5. The scale according to claim 4, wherein said rolling spherical member is enclosed within a hollow chamber inside said bracket.

6. The scale according to claim 1, wherein said counterweight assembly has a center of mass located on a first side of said pivot point and is arranged to apply a downward force on said break-over beam, and wherein said freely moveable counterweight mass causes said center of mass to move closer to said pivot point or to an opposite side of said pivot point from said first side upon movement of said freely moveable counterweight mass from said first position to said second position to thereby reduce the downward force applied by said counterweight assembly on said break-over beam.

7. The scale according to claim 1, wherein said freely moveable counterweight mass is arranged to automatically reset itself by moving back from said second position to said first position when said threshold scale weight is no longer exceeded in said weighing basket.

8. The scale according to claim 1, wherein said hanging assembly comprises a first weigh arm pivotally connected to said frame assembly, a first hanging link member connected between said first weigh arm and a first location on said weighing basket, a second weigh arm pivotally connected to said frame assembly, and a second hanging link member connected between said second weigh arm and a second location on said weighing basket, said first and second locations on said weighing basket being spaced apart in a longitudinal direction.

9. The scale according to claim 8, wherein said first and second weigh arms are connected to said break-over arm via a flexible connecting member and a series of pulleys.

10. The scale according to claim 8, further comprising a first weigh arm stop for limiting a downward movement of said first weigh arm when a center of mass within the weighing basket is closer to a first end of the platform, and a second weigh arm stop for limiting a downward movement of said second weigh arm when a center of mass within the weighing basket is closer to a second end of the platform.

11. The scale according to claim 10, wherein said first weigh arm is arranged to contact the first weigh arm stop prior to the second weigh arm contacting any obstruction when an animal enters the first end of the platform.

12. The scale according to claim 11, wherein said second weigh arm is arranged to contact the second weigh arm stop prior to the first weigh arm contacting any obstruction when an animal enters the second end of the platform.

13. The scale according to claim 12, wherein said first and second weigh arms are connected to said break-over arm via a flexible connecting member and a series of pulleys.

14. The scale according to claim 1, wherein said hanging assembly uses a lever ratio between 75 to 1 and 2 to 1 to convert heavier loads in the weighing basket to more manageable lighter loads at a point where the counterweight assembly is connected to said break-over beam.

15. The scale according to claim 1, wherein said frame comprises a lower frame and a top support cover positioned on top of said lower frame.

16. The scale according to claim 1, wherein said counterweight assembly includes a fixed counterweight mass that can be linearly adjusted relative to said pivot point of said bracket to change a location of a center of mass of the counterweight assembly relative to said pivot point, and thereby adjust a downward force applied by said counterweight assembly on said break-over beam to set the threshold scale weight.

17. A livestock scale, comprising:
a weighing platform with an entrance end and an exit end;
a hanging assembly for hanging said weighing platform, said hanging assembly comprising a beam supported by a pivot structure;
a counterweight assembly connected to said beam, said counterweight assembly comprising a freely moveable counterweight mass arranged to move from a first position to a second position when a threshold scale weight is exceeded on said weighing platform, wherein said counterweight mass causes an abrupt triggering of a scale-operated feature when said threshold scale weight is exceeded on said weighing platform.

18. The livestock scale according to claim 17, wherein said scale-operated feature is a marking mechanism for releasing a pigmented spray onto an animal weighed by said scale.

19. The livestock scale according to claim 17, wherein said freely moveable counterweight mass is a rolling spherical member.

20. The livestock scale according to claim 17, wherein said counterweight assembly has a center of mass arranged to apply a downward force on said break-over beam, and wherein said freely moveable counterweight mass causes said center of mass to move in a direction that reduces the downward force applied by said counterweight assembly on said break-over beam.

21. The livestock scale according to claim 20, wherein said counterweight assembly includes a fixed counterweight mass that can be linearly adjusted to change a location of a center of mass of the counterweight assembly relative to said break-over beam to set the threshold scale weight.

* * * * *